Jan. 1, 1952
B. HOPPE
2,580,784
KITCHEN CABINET ARRANGEMENT AND TABLE
Filed Jan. 17, 1946
7 Sheets-Sheet 1
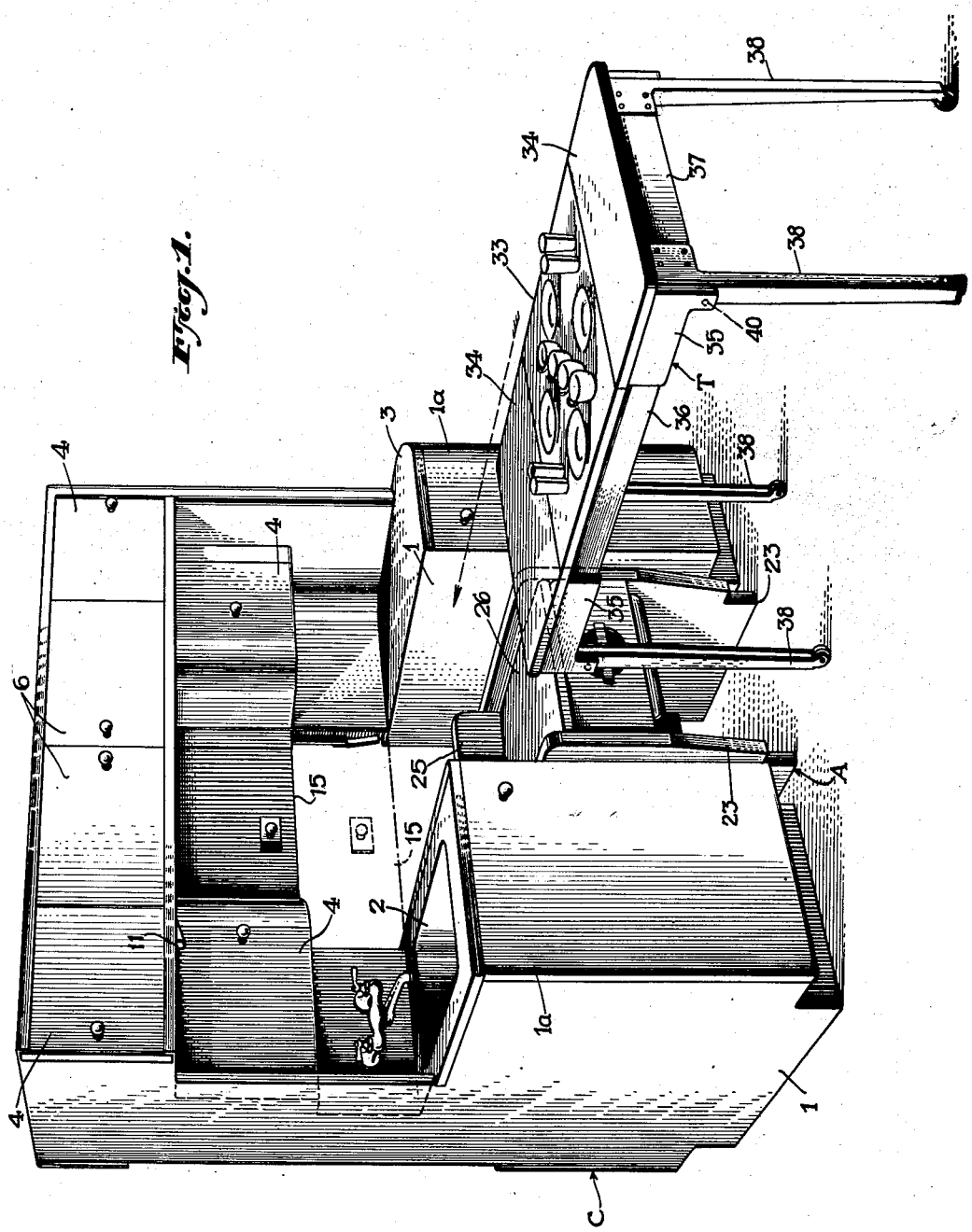
INVENTOR.
BORIS HOPPE.
BY
ATTORNEYS.

Jan. 1, 1952 B. HOPPE 2,580,784
KITCHEN CABINET ARRANGEMENT AND TABLE
Filed Jan. 17, 1946 7 Sheets-Sheet 2
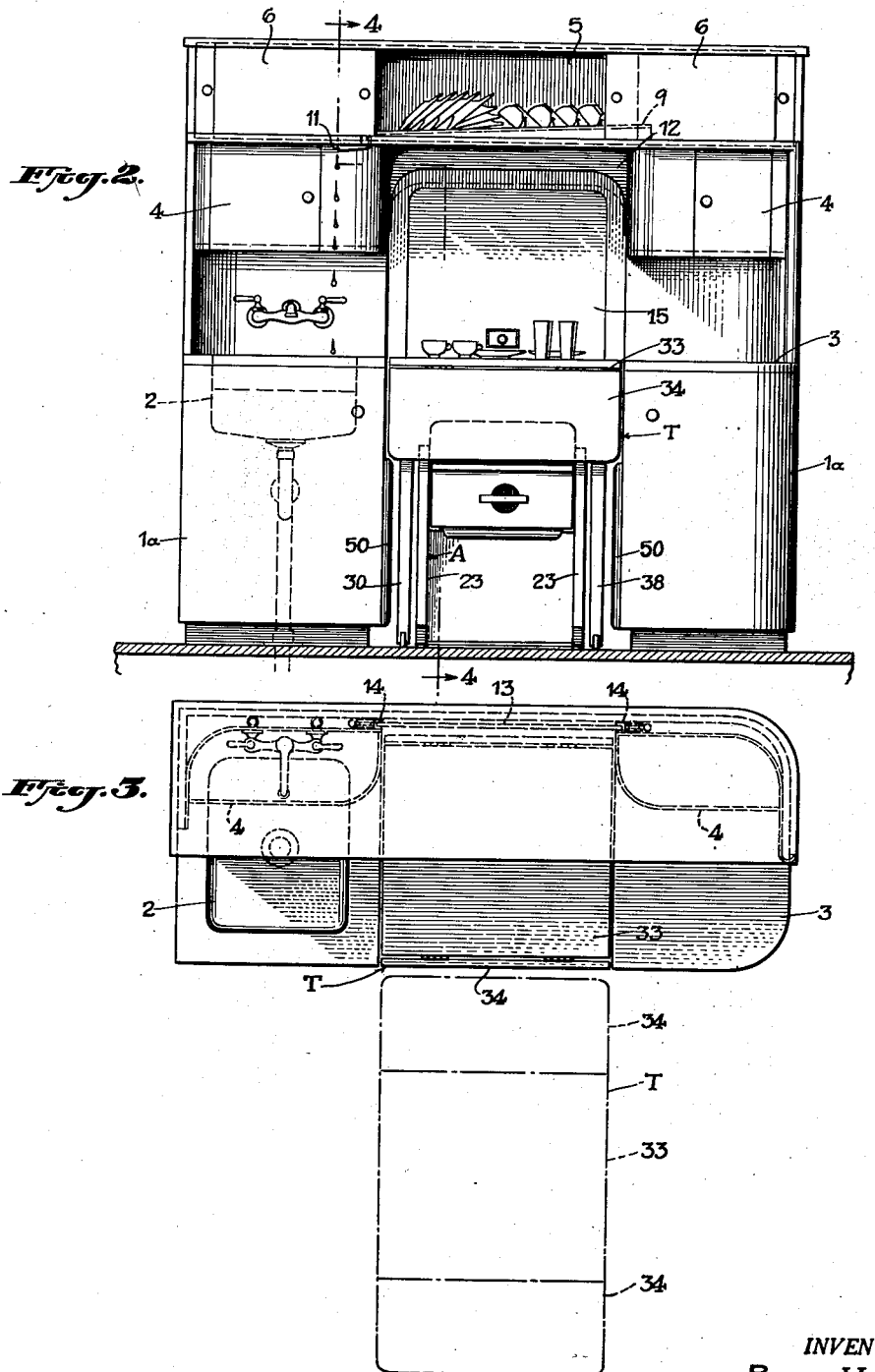
INVENTOR.
BORIS HOPPE.
BY
Ward, Crosby & Neal
ATTORNEYS.

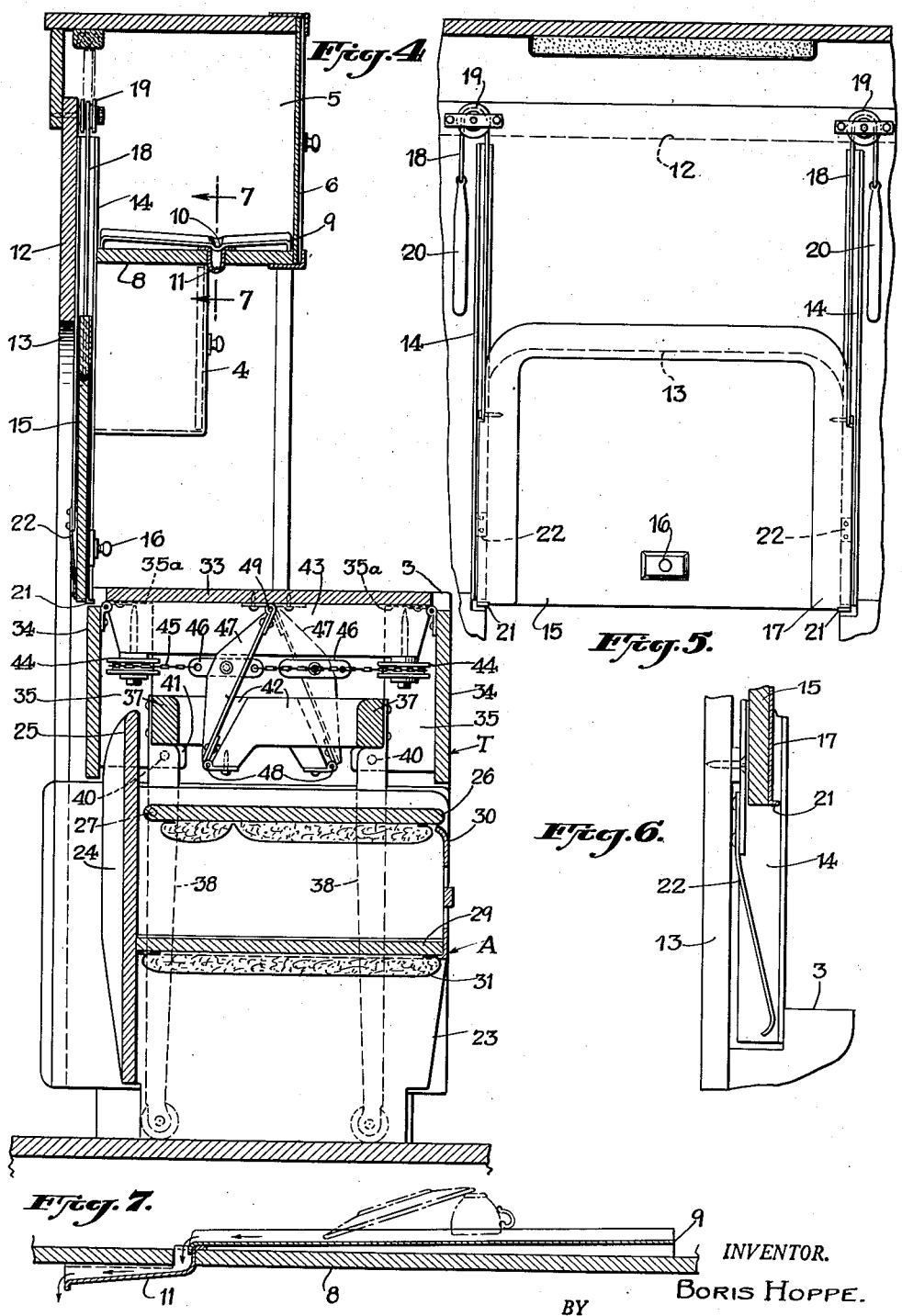

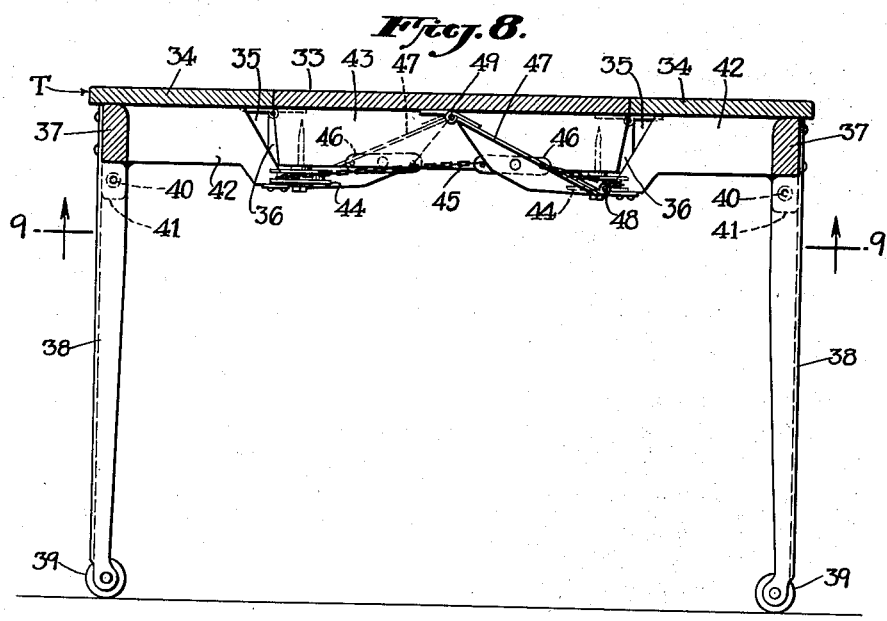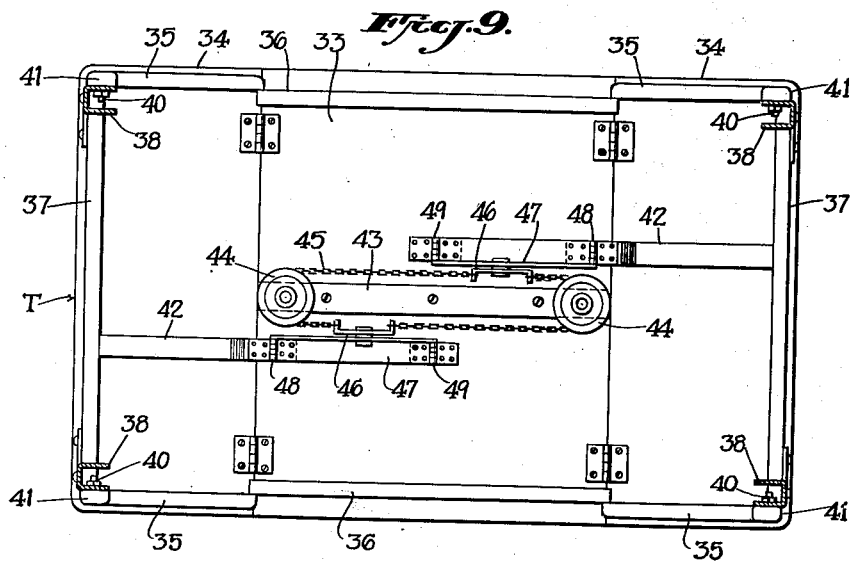

Jan. 1, 1952   B. HOPPE   2,580,784
KITCHEN CABINET ARRANGEMENT AND TABLE
Filed Jan. 17, 1946   7 Sheets-Sheet 5
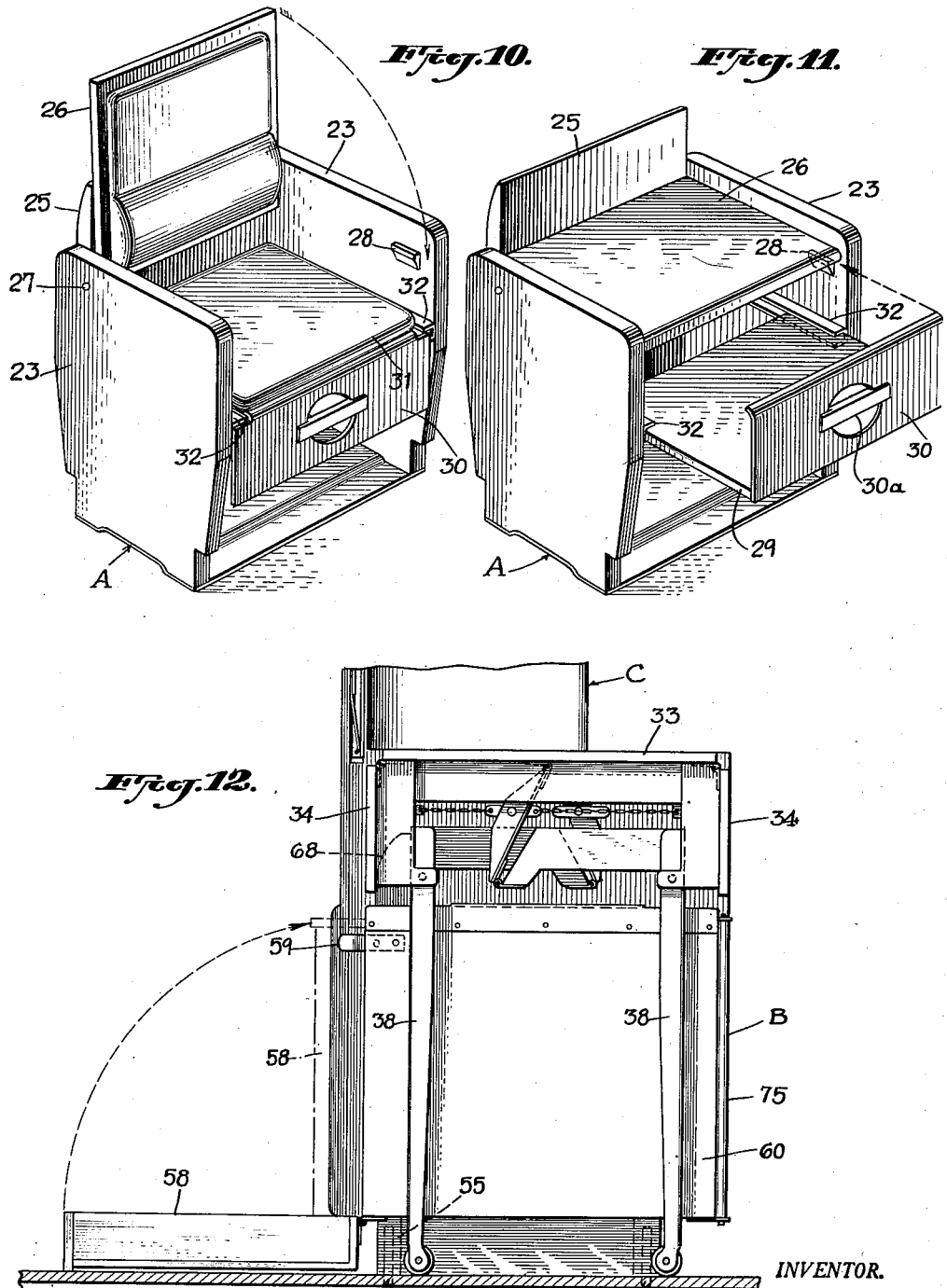
INVENTOR.
BORIS HOPPE.
BY
ATTORNEYS.

Jan. 1, 1952 B. HOPPE 2,580,784
KITCHEN CABINET ARRANGEMENT AND TABLE
Filed Jan. 17, 1946 7 Sheets-Sheet 6
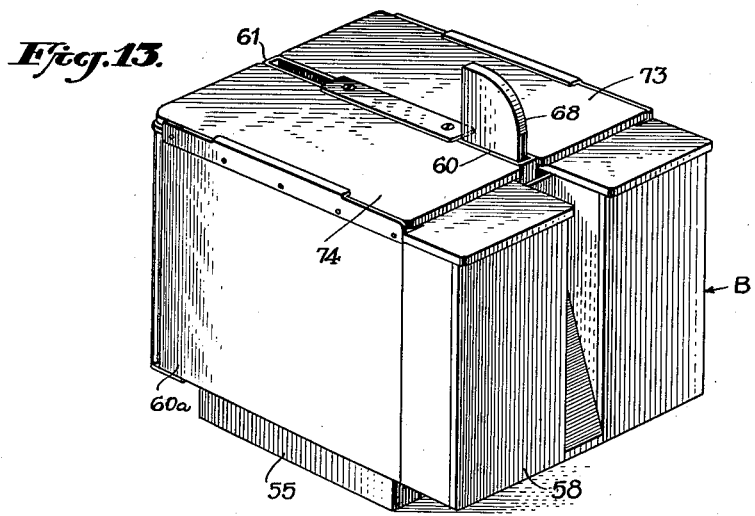
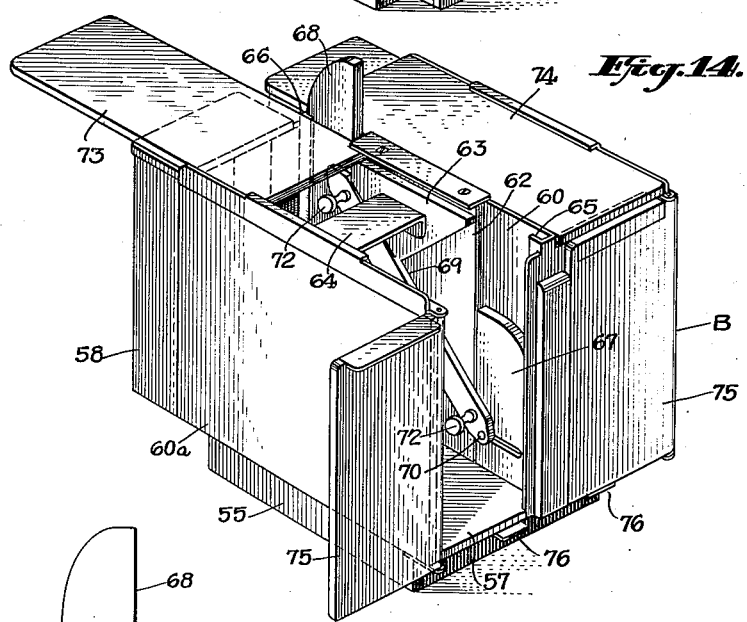
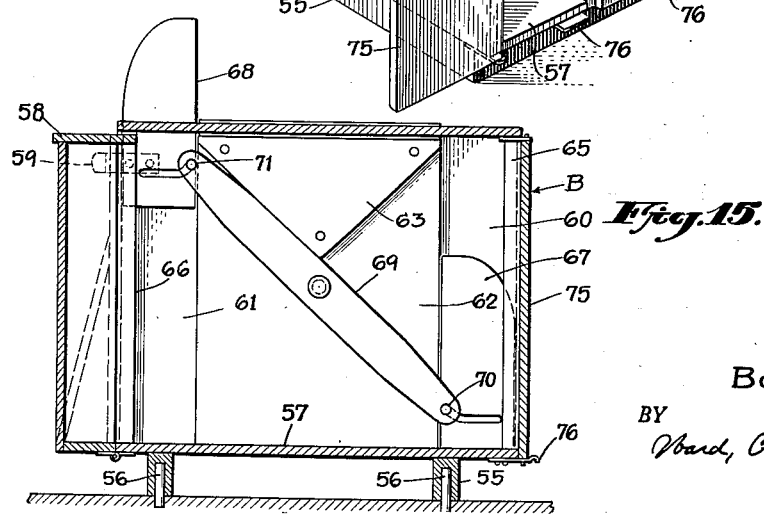
INVENTOR.
BORIS HOPPE.
BY
ATTORNEYS.

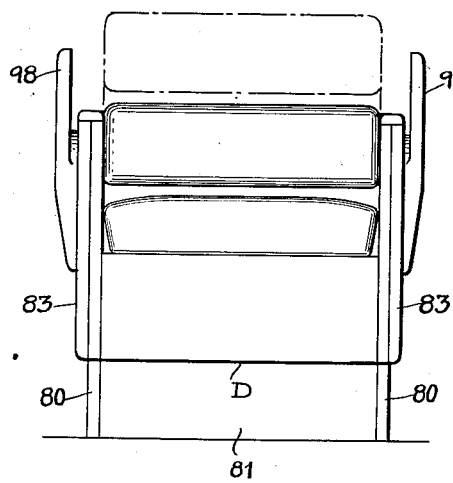
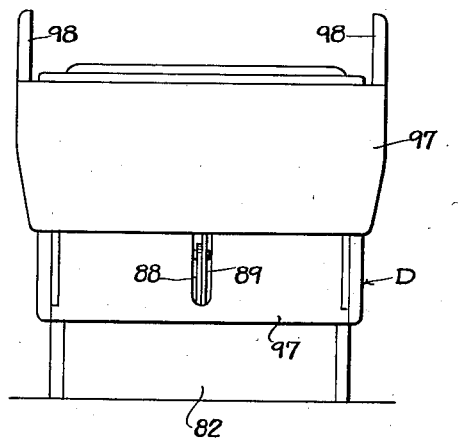
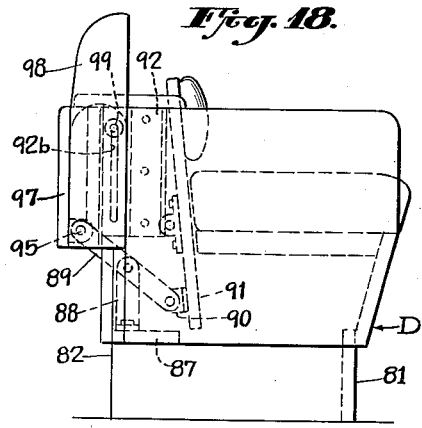
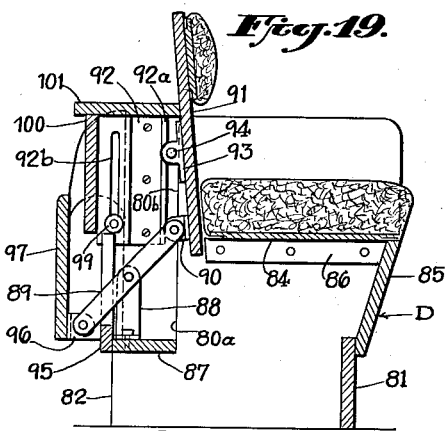
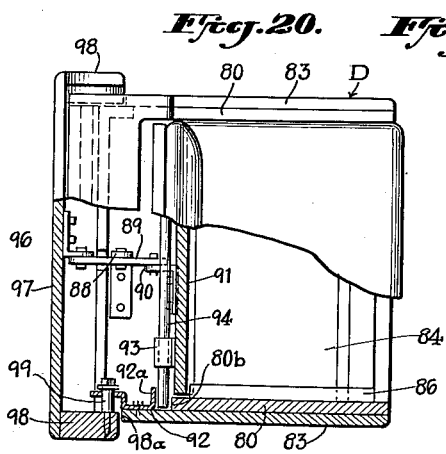
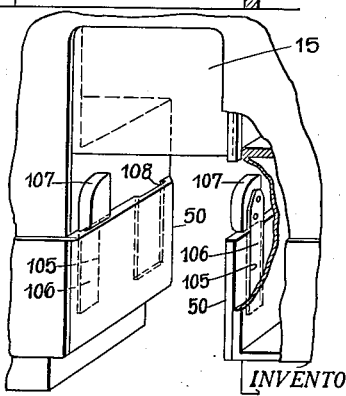
INVENTOR.
BORIS HOPPE.

Patented Jan. 1, 1952

2,580,784

UNITED STATES PATENT OFFICE 2,580,784

KITCHEN CABINET ARRANGEMENT AND TABLE

Boris Hoppe, Kew Gardens, N. Y.

Application January 17, 1946, Serial No. 641,739

12 Claims. (Cl. 312—277)

My invention relates to a cabinet-table arrangement adapted for kitchen use.

My copending application Serial No. 761,690, filed July 17, 1947, which has now matured into Patent No. 2,544,228, contains certain subject matter common to that disclosed herein.

My invention has particular reference to a cabinet having a compartment adapted to support a sink which, in order to be satisfactory for dish-washing purposes, should have height substantially greater than that of an ordinary dining table. In accordance with the invention, I provide a novel dining table having an upper surface which, normally, is at a substantially lower level than that of the upper surface of the aforesaid sink. After completion of a meal, the table is moved closely adjacent the sink and, responsive to the operation of a manually controlled mechanism, the upper surface of the table is elevated so as to coincide, approximately, with the upper surface of the sink. Thereupon, soiled dishes which have been stacked on the table may readily be removed therefrom and washed in the sink.

More particularly, the aforesaid table may be used for dining purposes either in the kitchen or in a dining room or alcove, the cabinet being of such character that, from either room, the table may readily be positioned beside and elevated with respect to the cabinet sink for dish-washing purposes in the manner described.

Further, the dining table may comprise hinged end leaves and the cabinet may comprise spaced compartments defining a passage which contains an abutment-forming chair or other fixed abutment which is engaged by a part of the table, when the latter is moved into dish-washing position, whereby, through mechanism associated with the table, the subsequent application of pressure to the table moves the horizontal table top upwardly approximately to the upper level of the sink and causes the table leaves and the table legs to be positioned vertically at the respective end areas of the table top.

Various other objects, advantages and characteristics of my invention will become apparent from the following detailed description.

My invention resides in the cabinet arrangement, cabinet-table arrangement and in the novel cabinet and table features of the character hereinafter described and claimed.

For an understanding of my invention and for an illustration thereof, reference is to be had to the accompanying drawings, in which:

Figure 1 is a perspective view showing the combined cabinet, abutment-forming chair and table of my invention;

Fig. 2 is an elevational view showing the table of my invention in elevated position beside the cabinet sink;

Fig. 3 is a plan view of the arrangement shown in Fig. 2;

Fig. 4 is a transverse, vertical sectional view, partly in elevation, taken on the line 4—4 of Fig. 2;

Fig. 5 is an elevational view showing an arrangement for counterbalancing the movable cabinet panel;

Fig. 6 is an enlarged, transverse sectional view, partly in elevation, showing a part of the movable cabinet panel and associated mechanism;

Fig. 7 is a vertical sectional view taken on the line 7—7 of Fig. 4 looking in the direction of the arrows;

Fig. 8 is a longitudinal, vertical sectional view, partly in elevation, showing a novel table of my invention;

Fig. 9 is a bottom plan view, partly in section, taken on the line 9—9 of Fig. 8 looking in the direction of the arrows;

Fig. 10 is a perspective view showing a novel chair of my invention;

Fig. 11 is a perspective view showing the chair of Fig. 10 after it has been collapsed;

Fig. 12 is an elevational view showing a novel compartment which is adapted to be disposed between the cabinet compartments, the compartment being shown in position between said cabinet compartments and beneath a table also disposed between said compartments;

Figs. 13 and 14 are perspective views showing the compartment of Fig. 12;

Fig. 15 is a vertical sectional view, partly in elevation, showing the comparaments of Figs. 12, 13 and 14;

Fig. 16 is a front elevational view showing another novel chair;

Fig. 17 is a rear elevational view showing the chair of Fig. 16;

Fig. 18 is a side elevational view showing the chair of Figs. 16 and 17;

Fig. 19 is a vertical sectional view, partly in elevation, showing the chair of Figs. 16, 17 and 18;

Fig. 20 is a plan view, partly broken away, showing the chair of Figs. 16–19 inclusive; and Fig. 21 is a perspective view, partly broken away, showing an abutment-forming arrangement utilizable in accordance with the invention.

Referring to Fig. 1, I have illustrated a cabinet C which may be located in any desired position in or with respect to one or more rooms. Thus, for example, the cabinet C may be disposed in a single room so that it forms a partial partition between different areas of the room. It may be disposed against an existing wall or, as a further example, it may be disposed in an opening formed in a wall between a kitchen, on the one hand, and a breakfast room or dining room, on the other hand.

As shown, the cabinet C may comprise lower spaced compartments 1 to which access may be had upon opening the respective doors 1a thereof. A sink or dish washer 2 may be mounted in suitable manner above the compartment 1 at the left and, above the compartment 1 at the right, there may be disposed a horizontal board or member 3. Alternatively, a stove may be disposed above either compartment 1. Preferably, the upper surface of the sink 2 and the board 3 should coincide with a horizontal plane or substantially so. The cabinet C may comprise a plurality of upper compartments which, normally, are closed by doors 4 either of the hinged or slidable type, preferably the latter.

In accordance with a detailed feature of the invention, the cabinet C comprises an upper compartment 5, Fig. 4, to which access may be had by one or more doors 6, Fig. 1, preferably but not necessarily of the slidable type. At the bottom of the compartment 5, Figs. 4 and 7, a board or member 8 is supported in suitable manner and, on top of the board 8, there is disposed a drain member 9 which should be formed from suitable non-rusting metal, porcelain or the like. The arrangement should be such that the drain member 9 inclines downwardly in a direction from right to left, Fig. 7, and also inwardly from the sides thereof, Fig. 4. The drain member 9 may comprise a central channel 10 which discharges into a trough-like member or spout 11, Fig. 7, the outlet end of which is disposed above the sink 2. In view of the foregoing, it will be understood that dishes may be washed in the sink 2 whereupon, the doors 6 being open, the washed dishes may be disposed upon the drain board 9 as indicated in Fig. 2. The dishes drain upon said drain board 9 and the accumulated water passes to the spout 11 and then drops down into the sink 2. Thus, in a satisfactory manner, the dishes are washed, drained and the drain water disposed of without further attention.

As shown in Figs. 2, 4 and 5, the cabinet C comprises a rear wall 12 which may be provided with an aperture or passage 13 extending upwardly from the floor surface and terminating a substantial distance above the upper surfaces of the sink 2 and the board 3. The aperture 13 should have width corresponding substantially with the distance between the facing surfaces of the above described lowermost compartments 1. A pair of channel members 14 may be suitably fixed in position at the front of the wall 12, these channel members extending vertically in substantially flush relation at the respective sides of the aperture 13, Fig. 3. The lower ends of the channel members 14 may terminate somewhat above the upper surface of the sink 1 and the board 2, and the upper ends thereof should terminate a substantial distance above the top of the aperture 13, Fig. 4. The channels defined by the respective members 14 face each other and serve as tracks in the manner hereinafter described.

Referring particularly to Fig. 5, a panel 15, carrying an actuating knob 16, may have a border strip 17 of metal or equivalent material secured thereto in engagement with the top and side surfaces thereof. The panel 15 should be counterbalanced in suitable manner and, to this end, each side thereof may have secured thereto the lower end of a wire 18 or other flexible element. Each wire 18 passes over a pulley 19 secured to the wall 12 and carries a weight 20 at its other end. As shown in Fig. 5, the border strip 17 extends beyond each side of the panel 15 and, at the lower surface thereof, terminates in the angular lugs 21. Each channel member 14 may have secured thereto the upper end of a leaf spring 22 which has set configuration as shown in Fig. 6. The panel 15, when in its lowermost position as shown in Figs. 4 and 5, closes the upper part of the hereinbefore described aperture 13. In this position, the springs 22 engage the respective opposite sides thereof and hold the lugs 21 in latching position with respect to the lower surfaces of the respective channel members 14. When it becomes desirable to elevate the panel 15, the knob 16 is pressed from right to left, Fig. 4, thereby moving the lugs 21 from the described latching position. As soon as this has been done, the panel 15 moves upwardly in response to the action of the weights 20. It will be understood that various other equivalent arrangements may be utilized for controlling movement of the panel 15 and, if desired, the counterweight arrangement may be omitted in which case said panel 15 may be retained in its upper position by a suitable latch arrangement. With the panel 15 in its lower position, it is a feature of the invention that, when the table is moved between the compartments 1, the advanced edge thereof may engage said panel and unlatch it from the lower ends of the channel members 14 whereupon the panel automatically moves to its upper position. This is done so that the table may be moved into the adjacent room.

Referring particularly to Figs. 1, 4, 10 and 11, I have shown a chair A which comprises spaced sides 23 and a back portion 24 suitably secured to each other in fixed relation, the back portion 24 comprising an extension 25, Fig. 11, which extends upwardly above the sides 23. The chair A comprises a back 26 which may be padded as shown and which is pivoted on an axis 27. The chair back 26 may take an upper position where it rests against the fixed extension 25 or it may be swung downwardly until it is substantially horizontal where it rests upon stops 28 carried by the respective sides 23. The chair A has a seat which may be formed from a supporting member 29 having a front panel 30 suitably secured thereto in right-angular relation, the panel 30 carrying a suitable handle 30a. As the parts are shown in Fig. 10, the upper surface of the supporting member 29 may carry a pad or cushion 31, the panel 30 extending downwardly from said supporting member 29 at the front of the chair. The member 29 may be supported in readily detachable relation by facing channel member 32 secured to the respective sides 23 of the chair. Accordingly, the seat of the chair may be disposed in normal position as shown in Fig. 10 or the position thereof may be reversed and, if so, it serves to provide a drawer by reason of the fact that the front panel 30 extends upwardly. Therefore, when the back of the chair is folded downwardly as shown in Fig. 4, the front panel 30 closes the intervening space between the reversed seat of the chair and the folded back thereof. In accordance with the invention and for a reason hereinafter described, the chair A, with the parts thereof positioned as shown in Fig. 4, may be located between the cabinet compartments 1 with the back portion 24 of the chair disposed just inwardly of the plane of the cabinet wall 12.

Referring particularly to Figs. 8 and 9, I have shown a novel table T which may comprise a top 33 having similar hinged leaves 34 at the respective opposite ends thereof. The lower surface of each leaf 34 may have secured thereto, at the respective opposite sides thereof, the respective depending plan members 35 which are disposed in parallel relation. At each side of the table, the members 35, one on each leaf 34, are disposed in alinement longitudinally of the table. If desired, depending plane members 36, disposed in parallel relation, may be secured to the respective opposite sides of the table top 33, the members 36 being disposed inwardly of the respective sets of longitudinally alined members 35. The depending members 35 on each table leaf 34 may support a table leg structure which, in each instance, may comprise a cross bar 37 disposed beneath the table leaf and extending between the members 35 at the outer ends thereof. The bar 37, at opposite ends thereof, has the respective table legs 38 fixed thereto, each leg 38 carrying a lower roller 39. Each table leg 38 may be pivoted, as at 40, to a depending lug 41 of the adjacent member 35. Each bar 37 has an inwardly extending arm 42 secured thereto for movement therewith as a unit, these arms being suitably located in non-alined relation so that they may be utilized as hereinafter described.

A block 43, secured to the lower surface of the table top 33, has pulleys or wheels 44 journaled at the respective opposite ends thereof. The pulleys 44 are engaged by an endless chain 45, or equivalent, which, on opposite sides of the block 43, may have the respective non-alined brackets 46 included in the span thereof. The brackets 46 are pivoted, respectively, to levers 47 which are longitudinally alined with the aforesaid arms 42, respectively. One end of each lever 47 is pivoted as at 48, to the adjacent end of each arm 42 and the opposite end of each lever 47 is pivoted, as at 49, to the lower surface of the table top.

Arm 42 and lever 47 acting in combination with their respective leaf 34 and respective portion of table top 33 comprise a parallelogram-like mechanism for interconnecting the drop leaf, legs and top whereby the height of the latter can be changed in response to pressure acting on the end or opposite ends of the table which causes a shifting of the base member (arm 42) of such mechanism.

In accordance with the invention, the table T, by virtue of the arrangement described above, may be positioned as shown in Fig. 8 wherein the table leaves 34 are in the plane of the table top 33. At this time, the table T is supported by its four legs 38, which are in vertical position, and either one or both of the arms 42 are in engagement with a lower surface of the respective table leaves 34. As a result, the table leaves 34 and the table top 33 are positively retained in a horizontal plane as shown and each table leg 38, likewise, is positively retained in vertical position. When in this condition, the table T is adapted to be used for dining purposes; the length of the legs 38 being so selected that the height of the table is proper for the purpose stated.

Alternatively, by virtue of the arrangement described, the table T may be positioned as shown in Fig. 4 wherein each of the table leaves 34 has been moved into a vertical position with respect to the table top. The table T is still supported by its four legs 38 which remain in vertical position even though they are closer to each other. When the table is arranged as shown in Figs. 8 and 9, the above described members 35, which are carried in pairs by the respective table leaves 34, are horizontally disposed. However, when the table is arranged as shown in Fig. 4, these members 35 are vertically disposed and, hence, cooperate with the respective table legs 38 to increase the height of the table top 33 compared with the height thereof when the table is arranged as shown in Fig. 8. With the table arrangement of Fig. 4, either one, two or more of the now vertical members 35 is or are in engagement with the lower surface of the table top 33 as indicated at 35a, Fig. 4. Further, with the table arrangement of Fig. 4, the pivots 40, which attach the respective table legs 38 to the lugs 41, are disposed inwardly of the above described engaged surfaces 35a. As a result, the table leaves 34 and the table top 33 are positively retained as shown in Fig. 4. When in this condition, the table top 33 may support soiled dishes at one side of the sink 2. Hence, the dimensions should be so chosen that, when the table top 33 is positioned as last described, the upper surface thereof should coincide approximately with the upper surface of the sink 2 and the board 3.

For kitchen dining, the table T, the leaves 34 being in horizontal position, may be positioned substantially as shown in Fig. 1 and, if desired, one end thereof may be located adjacent the chair A which, when it is in the non-collapsed position shown in Fig. 10 and while between the compartments 1 or removed therefrom as desired, may be used by one of the persons to be seated at the table. After completion of the meal, all soiled dishes on the table leaves 34 are removed therefrom and deposited on the table top 33, Fig. 1. Prior to the time that the table is to be moved into dish-washing position between the compartments 1, the movable parts of the chair A should be moved to the respective positions thereof shown in Fig. 4; the extension 25 on the back portion 24 should be disposed just inwardly of the plane of the cabinet wall 12 and the sides 23 of the chair should be spaced equidistantly or substantially so from the adjacent facing surface of the compartments 1. In case it is desirable to restrict the space at each side of the chair A so as to better guide the table T to its dish-washing position, face plates 50 may be secured to said facing surfaces of the compartments 1. Thereupon, with the table T so positioned that the pairs of legs at the respective opposite sides thereof are in alinement with the respective passages at opposite sides of the chair A as indicated in Fig. 3, said table T is moved longitudinally between the compartments 1 of the cabinet C. In so doing, the forward bar 37 of the forward leg structure which is disposed beneath the forward horizontal table leaf 34 engages the upstanding chair extension 25 which serves as a stationary abutment, the height of which is so chosen that the top surface thereof is disposed slightly below the lower surface of said table leaf 34 when engagement is thus effected. In response to continued movement of the table T, the forward leg structure including the above noted bar 37 and the two table legs 38 associated therewith remain stationary. However, the rear edge of the forward table leaf 34 swings upwardly accompanied by similar elevation of the advanced edge of the table top 33. Simultaneously, through the described mechanism comprising the parts 42, 47, 46, 45, etc., similar movement is imparted to the rear edge of the table top 33 and the forward edge of the rear table leaf 34. As a result, the rear table legs 38 move toward the stationary, forward table legs 38 and the table takes the position shown in Fig. 4.

Responsive to the operation described above, the table top 33, with the soiled dishes thereon, is elevated to the position shown in Fig. 4 wherein it coincides with the upper surface of the sink 2, or substantially so. The dish-washing operation may now be proceeded with and, the cabinet doors 6 being open, the washed dishes may be deposited on the drain member 9 whereupon the water drains therefrom and returns to the sink by way of the spout 11.

When desired, the table T may readily be withdrawn from the space between the compartments 1 and, then, one or both ends thereof may be grasped whereupon, by a pulling action, the table parts may readily be positioned as shown in Fig. 8.

When the meal is served in the kitchen as described above, the hereinbefore described panel 15 should be in its lower position. As hereinbefore stated, the cabinet C may be disposed in a single room where it forms a partial partition between different areas thereof, or it may be disposed in an opening formed in a wall between the kitchen and a breakfast room or alcove, for example. With either of the arrangements last described, the table T may be positioned in the room which is separate from the kitchen area and a meal served thereon while the table leaves 34 are in horizontal position. Prior to the time that the meal is served, the panel 15 may be elevated and the chair A positioned between the compartments 1 in a manner the reverse of that hereinbefore described, i. e., so that it faces into the room where the meal is to be served. After completion of the meal, the table T, carrying the soiled dishes on the table top 33, may be moved through the passage 13 of the cabinet wall 12, below the elevated panel 15, and into position beside the sink 2. Before this is done, the reversed chair A should be fixed in proper position for engagement of the chair extension 25 by the forward table bar 37 so that the table top 33 may be elevated as it reaches its intended position beside the sink 2.

Referring to Figs. 12–15 inclusive, I have shown a compartment or housing B which may comprise a base 55 having suitable configuration and carrying a plurality of depending pins 56 utilizable as hereinafter described. Secured to the base 55 is a bottom member 57 which may have a tray 58 pivoted thereto. The tray 58 may be retained, by a friction member 59, in a vertical position, Fig. 15, where it closes the rear of the compartment B. Or, if desired, it may be lowered to a horizontal position as shown in Fig. 12 so that it may serve as a container for any desired articles.

The compartment B comprises side walls 60a and a central, longitudinally extending partition. This partition may comprise forward and rear, vertically extending members 60 and 61 formed from sheet metal, or equivalent, which may be secured to an intermediate wall 62 fastened to and upstanding vertically from the bottom member 57, the thickness of the wall 62, preferably, being substantially greater than that of either of the members 60 and 61. A triangular member 63 may be secured flush against an upper surface of the wall 62 and a suitable brace 64, Fig. 14, may extend from the member 63 to the adjacent side wall 60a. Although not shown, a suitable bracing arrangement may be provided at the other side of the partition formed from the members 60, 61 and the intermediate wall 62.

At the front and rear of the compartment B, the respective members 60 and 61 may be shaped to form vertical tracks 65 and 66 which cooperate with the respective, adjacent surfaces of the wall 62 to guide abutment members 67 and 68 for vertical movement. An arm 69 pivoted to the wall 62 carries, at opposite respective ends thereof, pins 70 and 71 which are freely movable in horizontal slots formed in the members 67 and 68. Preferably, the arm 69 has actuating knobs 72 secured to the respective ends thereof. As shown in Fig. 15, each of the aforesaid slots may merge into an inclined end portion adapted to receive the respective pins 70, 71 whereby the respective abutments 67, 68 are releasably locked in elevated position.

In suitable manner, the compartment B may have a pair of cover plates 73, 74 associated therewith and, if desired, these cover plates may be arranged in readily detachable relation. As shown, the cover plates 73, 74 are spaced from each other so that, in the manner hereinafter described, the abutment members 67, 68 may alternately be moved above the top surface of the compartment B. It will be understood that the aforesaid partition forms two chambers in said compartment B and these, at the front thereof, may be closed by the respective hinged doors 75 which may releasably be retained in closed position by friction members 76, respectively.

The compartment B described above is intended to be disposed in the space between the compartments 1 of the cabinet C in generally the same manner as hereinbefore referred to with respect to the chair A. When the compartment B is properly positioned, the pins 56 hereinbefore referred to should be seated in the kitchen floor so as to positively anchor said compartment in its intended position.

Referring to Fig. 12, the compartment B is indicated as located in operative position beween the compartments 1 of the cabinet C. The abutment 68 is elevated and it will be understood that the vertical surface thereof should occupy substantially the same position as that taken by the front surface of the hereinbefore described extension 25 of the chair A, Fig. 4. Accordingly, the forward bar 37 of the table T, when the parts thereof are positioned as shown in Fig. 1, may be pressed into engagement with the vertical surface of the abutment 68 with consequent elevation, in the manner hereinbefore described, of the table top 33 approximately to the level of the upper surface of the sink 2.

With the arrangement of Fig. 12, it will be understood that, necessarily, the table T is in the kitchen when it is moved into dish-washing position. In case said table T is located in the dining alcove, for example, the lever 69, prior to the dish-washing operation, is swung in a counter-clockwise direction from the position thereof shown in Fig. 15 to thereby lower the abutment 68 and elevate the abutment 67. Thereupon, after completion of a meal and with the cabinet panel 15 elevated, the forward bar 37 of the table T, when the parts thereof are positioned as shown in Fig. 1, may be pressed into engagement with the vertical surface of the abutment 68 with consequent elevation of the table top 33 in the manner described above.

In view of the foregoing, it will be understood that the compartment B is intended to be permanently located between the cabinet compartments 1. Merely by operation of the lever 69, the proper abutment may be elevated so that the table may be moved into dish-washing position either from the kitchen or the room adjacent thereto.

Referring to Figs. 16–20 inclusive, I have shown a novel chair D which may comprise side members 80 joined at their lower ends in base-forming relation by front and rear members 81 and 82. Each side member 80 may have an upper member 83 secured to the exterior surface thereof. The chair D comprises a seat 84, preferably padded, which may be supported by a front panel 85 and strips 86 secured interiorly to the respective side members 80.

The side members 80, at the rear thereof, may support a horizontal member 87 which carries an upstanding bracket 88 having a lever 89 pivoted thereto midway between the ends thereof. One end of the lever 89 is pivoted to an ear or lug 90 which, in suitable manner, is secured to the rear surface of a chair back 91 which, preferably, is padded as indicated. Each side member 80 is recessed as indicated at 80a, Fig. 19, and, to the interior surface of each member 83 which is thereby exposed, there is secured a metallic member 92, or equivalent. The members 92 are transversely aligned and they comprise the respective angular portions 92a which, likewise, are transversely aligned. Each angular portion 92a cooperates with a surface 80b of the adjacent member 80 to form a vertical track, Fig. 19. Suitably secured, as by brackets 93, to the rear surface of the chair back 91 is a horizontal rod 94, each end of which is received in a vertical track as above described.

One end of the aforesaid lever 89 extends through an elongated slot formed therefor in a member 95 secured to the rear surface of the members 80. The end of the lever 89 last named is pivoted to a lug or ear 96 carried by a plate 97 which has abutment-forming members 98 secured to the respective opposite ends thereof. As indicated in Figs. 18 and 20, each member 98 carries a horizontal pin 99. These pins are freely received in vertical slots 92b provided respectively therefor in the aforesaid members 92. Further, as shown in Fig. 20, the front surface 98a of each member 98 is adapted to slidably contact with the rear surface of the adjacent side member 83.

The chair D may further comprise a rear wall member 100 which may be secured to the rear surfaces of the respective members 92 and, further, a top plate 101 may span the rear gap between and be secured to the members 83.

The chair D, when the parts thereof are positioned as shown in Figs. 18 and 19 may be utilized as a seat, for example, as hereinbefore described with respect to the chair A. When the chair D is to be positioned in the space between the cabinet compartments 1 with the abutments 98 thereof in operative position, the plate 97 may be engaged manually and moved upwardly, while holding the chair stationary, to thereby swing the lever 89 in a clockwise direction, Fig. 19. In so doing, the plate 97 and the abutments 98 are elevated as shown in Figs. 16, 17 and 18. At the same time, the chair back 91 is lowered to the position thereof shown in Figs. 16 and 18. The pins 99 move in the respective slots 92b to guide said plate 97 and the abutments 98 to upper position, this guiding action being facilitated by engagement of the abutment surfaces 98a with the respective rear surfaces of the plates 83. At the rear of the chair back 91, the rod 94 traverses the described tracks which are provided therefor and hence guides said chair back to its lower position. Obviously, an operation of the character described above may be performed by applying downward pressure to the chair back 91, rather than upward pressure to the plate 97, while holding the chair stationary.

After the chair parts have been positioned as shown in Fig. 18, the chair D may be positioned in the space between the cabinet compartments 1 in the same manner as hereinbefore described with respect to the chair A. In so doing, the vertical surfaces of the respective abutments 98 should be caused to occupy the same plane as that occupied by the front surface of the hereinbefore described upper extension 25 of the chair A, Fig. 4. After the chair D has thus been properly positioned, the table T, when the parts thereof are positioned as shown in Fig. 1, may be moved into dish-washing position in the same manner as hereinbefore described with respect to the chair A. The chair back 91 of the chair D is in its lower position and, hence, does not interfere with movement of the table when the forward bar 37 thereof is engaged with the elevated abutments 98 to thereby elevate the table top 33 in a manner which will be understood in view of the previous description. When the table T is thus positioned, the table top 33 is above the chair back 91 and is effective to prevent upward movement thereof with consequent undesired lowering of the abutments 98.

With the forms of the invention hereinbefore described, elevation of the table top 33 to dish-washing position was effected in response to movement of a part of the table into engagement with one or more abutments which were carried either by a chair or a housing such as the compartment B. It shall be understood, however, that the invention is not to be thus limited. Thus, referring to Fig. 21, the hereinbefore described face plates 50 are shown as provided, respectively, with vertical slots 105 which are transversely alined for the reception, preferably detachably, of members 106, each of which carries an abutment 107 constructed and arranged in such manner that the respective vertical surfaces thereof are in transverse alinement. Obviously, with the arrangement disclosed in Fig. 21, the forward bar 37 of the table T, when the parts thereof are positioned as shown in Fig. 1, may be pressed into engagement with the vertical surfaces of the abutments 107 with consequent elevation of the table top 33 to dish-washing position. The table T is in the kitchen when it is thus moved into engagement with the abutments 107. However, the face plates 50, at the other end thereof, may be provided with a pair of transversely alined, vertical slots 108 which may receive the respective abutment-carrying members 106 in a manner the reverse of that shown. If so, as will be understood, the panel 15 may be elevated and the table moved to elevated position beside the sink 2 from a room adjacent the kitchen.

Although the cabinet C of my invention has been hereinbefore described as comprising spaced compartments 1, it shall be understood that the invention is not to be thus limited. Thus, for example, said cabinet C may comprise a single compartment which functions for the support of the sink and further, if desired, the sink may be supported in the position to which the table is elevated otherwise than by a cabinet or a compartment thereof.

In the present preferred form of the invention, the table T is formed from a table top having end leaves hinged thereto. However, the invention is not to be thus limited. Thus, under some circumstances, the table T which is operative in accordance with the invention may be without end leaves or it may comprise a single end leaf if desired.

The panel 15 hereinbefore described is elevated when the table is to be moved to dish-washing position form a room adjacent the kitchen. This is done so that the table may be moved through the cabinet wall aperture 13 without disturbing the soiled dishes which are supported thereby. When the arrangement is such that the table T remains continuously in the kitchen, the panel 15, if desired, may be omitted in favor of a permanent part of the cabinet wall 12.

In case the weight of the chairs A and D hereinbefore described is insufficient to retain them in the intended operative position between the cabinet compartments 1, it will be understood that suitable anchoring means may be provided to positively secure either chair in its intended position.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. In combination, a cabinet, a member supported at a desired level upon said cabinet, a table comprising a horizontal table top and a leaf hinged to one end thereof, said table top having a height substantially less than that of the top surface of said member, said table being constructed and arranged to be moved, while the table top and its leaf are horizontally disposed, to a position at one side of said member, and means below said table top responsive to movement of the table to said position for engaging a stationary element operatively associated with said cabinet and for moving the horizontal table top upwardly and there retaining same approximately at the upper level of said member with the table leaf depending from said table top.

2. In combination, a compartment comprising a part of a cabinet, said compartment having a top surface at a desired level, an abutment operatively associated with said cabinet, including means for supporting same in a predetermined position relative to said compartment, a table comprising a horizontal table top and a leaf hinged to one end thereof, said table top having a height substantially less than that of the top surface of said compartment, said table, while its leaf is in the horizontal plane of the table top, being constructed and arranged to be moved to a position at one side of said compartment until a part thereof engages said abutment whereupon pressure may be applied to the table through its engagement with the abutment, and mechanism associated with and below said top and initially below said leaf of the table and responsive to such application of pressure to move the horizontal table top upwardly approximately to the same level of the top surface of said compartment with the table leaf depending from said table top.

3. In combination, a pair of spaced compartments comprising a kitchen cabinet, said cabinet being constructed and arranged to provide a passage which extends between said compartments from one room area to another room area, a table comprising a table top having a height substantially less than that of the top surface one of said compartments, and means below said top and responsive to movement of the table to a position between said compartments for engaging a relatively stationary element operatively associated with said cabinet thereby raising the horizontal table top and retaining same approximately at the upper level of one of said compartments.

4. In combination, a cabinet having spaced compartments, one of said compartments having a top at a predetermined level, an abutment, a table comprising a table top and leaves hinged to the respective ends thereof, said table, while the leaves thereof are in the horizontal plane of the table top, being constructed and arranged to be moved into the space between said compartments until a part thereof engages said abutment whereupon pressure may be applied to the table through its engagement with the abutment, and mechanism secured to the table and below the table top and responsive to such application of pressure to move the horizontal table top upwardly approximately to the predetermined level of the compartment top while causing the table leaves and the table legs to be positioned vertically at the respective end areas of the table top, said abutment having means for supporting same in operative association with said cabinet whereby said abutment is in the path of movement of a portion of said table when the latter is moved between said compartments.

5. In combination, a cabinet having spaced compartments, a receptacle supported at the top of one of said compartments, a structure disposed in the space between said compartments, an abutment carried thereby, a table including legs, a table top and leaves hinged to the respective ends of such top, said table, while the leaves thereof are in the horizontal plane of the table top, being constructed and arranged to be moved into said space until a part thereof engages said abutment whereupon pressure may be applied to the table through its engagement with the abutment, and mechanism secure to the table below said top and responsive to such application of pressure to move the horizontal table top upwardly approximately to the upper level of said receptacle while causing the table leaves and the table legs to depend from the respective end areas of the table top.

6. In combination, a cabinet having spaced compartments, one of said compartments having a sink supported at the top thereof, a structure adapted to be disposed in the space between said compartments, a movable abutment carried by such structure, means for elevating said abutment from non-operative to operative position, a table comprising a table top and a pair of leaves hinged one each to the respective ends thereof, said table, while the leaves thereof are in the horizontal plane of the table top, being constructed and arranged to be moved into said space until a part thereof engages said abutment when said structure is disposed in the space between said compartments whereupon pressure may be applied to the table through its engagement with the abutment, and mechanism secured to the table below the top thereof and responsive to such application of pressure to move the horizontal table top upwardly approximately to the upper level of the sink while causing the table leaves and the table legs to depend from the respective end areas of the table top.

7. In combination, a cabinet having spaced compartments, one of said compartments having a sink supported at the top thereof, said cabinet being constructed to provide a passage which extends between said compartments from one room areas to another room area, abutment means in said passage, means for supporting said abutment means in operative association with said cabinet, a table including legs and a horizontal table top and a leaf hinged to one end thereof, said table, while the leaf thereof is in the horizontal plane of the table top, being constructed and arranged to be moved from either room area to a position between said compartments until a part thereof engages said abutment means whereupon pressure may be applied to the table through its engagement with the abutment means, and mechanism secured to the table below the top thereof for operatively interconnecting said legs, leaf and top, said mechanism being responsive to such application of pressure to move the horizontal table top upwardly approximately to the upper level of said sink with the table leaf depending from said table top.

8. In combination, a cabinet having spaced compartments, said cabinet being constructed to provide a passage which extends between said compartments from one room area to another room area, abutment means in said passage, means for supporting said abutment means in operative association with said cabinet, a table comprising a horizontal table top and a leaf hinged to one end thereof, said table, while the leaf thereof is in the horizontal plane of the table top, being constructed and arranged to be moved to a position between said compartments until a part therof engages said abutment means whereupon pressure may be applied to the table through its engagement with the abutment means, and mechanism secured to the table below the top thereof and responsive to such application of pressure to move the horizontal table top upwardly approximately to the upper level of one of the compartments with the table leaf depending vertically from said table top.

9. In combination, a cabinet having spaced compartments, one of said compartments having a receptacle supported at the top thereof, said cabinet being constructed to provide a passage which extends between said compartments from one room area to another room area, a structure disposed in said passage, an abutment carried thereby, a table comprising a table top and leaves hinged to the respective ends thereof, said table, while the leaves thereof are in the horizontal plane of the table top, being constructed and arranged to be moved to a position between said compartments until a part thereof engages said abutment whereupon pressure may be applied to the table through its engagement with the abutment, and mechanism secured the table below the top thereof and responsive to such application of pressure to move the horizontal table top upwardly approximately to the upper level of said receptacle while causing the table leaves and the table legs to be positioned vertically at the respective end areas of the table top.

10. In combination, a cabinet having spaced compartments, one of said compartments having a receptacle supported at the top thereof, said cabinet being constructed to provide a passage which extends between said compartments from one room area to another room area, a structure adapted to be disposed in said passage, a movable abutment carried thereby, means for elevating said abutment from non-operative to operative position, a table including a table top and leaves hinged to the respective ends thereof and legs angularly shiftable relative to said leaves, said table, while the leaves thereof are in the horizontal plane of the table top, being constructed and arranged to be moved to a position between said compartments until a part thereof engages said abutment when said structure is disposed in said passage whereupon pressure may be applied to the table through its engagement with the abutment, and linkage operatively interconnecting said legs, leaves and top and responsive to such application of pressure to move the horizontal table top upwardly approximately to the upper level of said receptacle while causing the table leaves and the table legs to be positioned vertically at the respective end areas of the table top.

11. In combination, a cabinet having an article of kitchen equipment supported thereby; a table comprising a horizontal table top member normally having a height substantially less than that of the top surface of said article; said table having a support structure rendering the table self-supporting, said table being movable to a position at one side of said article, such support structure including a pair of leaves hingedly mounted to opposite edges of said table top member and also including table legs pivotally associated with such leaves; a pair of parallelogram-like mechanisms operatively associated with respective of said leaves and the legs associated therewith; means for operatively interconnecting the parallelogram-like mechanisms; and mechanism for engaging the table support structure, said leaves and horizontal table top member initially being in a common plane, such engagement of the table support structure being in response to movement of the table alongside of the article, the horizontal table top member being movable upwardly approximately to the upper level of the article in response to pressure of said table support structure against said engaging mechanism, said table support structure acting to support the table top member independently of the cabinet at the lesser height and the upper level.

12. In combination, a cabinet adapted for use with an article of kitchen equipment which is supported thereby; a table comprising a horizontal table top and a leaf hinged to one end thereof, said table including legs, said table top having a height substantially less than that of the top surface of the article when said table top and leaf are horizontal, said table being constructed and arranged to be moved, while the table top and its leaf are horizontally disposed, to a position at one side of the article; a linkage secured to and below said table top for operatively interconnecting said leaf, top and legs; and means responsive to the pressing of said table into such position for actuating said linkage and moving said table top upwardly to the upper level of the article with the table leaf depending from said table top.

BORIS HOPPE.

REFERENCES CITED

The following references are of record in the file of this patent:

UNITED STATES PATENTS

| Number | Name | Date |
| --- | --- | --- |
| 451,006 | Singer | Apr. 21, 1891 |
| 919,015 | Hummel | Apr. 20, 1909 |
| 1,124,655 | Powell | Jan. 12, 1915 |
| 1,456,711 | Petersen | May 29, 1923 |
| 2,101,230 | Anderson | Dec. 7, 1937 |
| 2,257,425 | Mezzetti | Sept. 30, 1941 |